United States Patent
Zhou et al.

(10) Patent No.: US 8,908,809 B2
(45) Date of Patent: Dec. 9, 2014

(54) COMPLEXITY REDUCED FEED FORWARD CARRIER RECOVERY METHODS FOR M-QAM MODULATION FORMATS

(75) Inventors: Xiang Zhou, Holmdel, NJ (US); Yifan Sun, Naperville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 340 days.

(21) Appl. No.: 12/968,454

(22) Filed: Dec. 15, 2010

(65) Prior Publication Data

US 2012/0155890 A1    Jun. 21, 2012

(51) Int. Cl.
*H04L 27/00* (2006.01)
*H04B 10/61* (2013.01)
*H04L 27/38* (2006.01)

(52) U.S. Cl.
CPC ........ *H04B 10/6165* (2013.01); *H04L 27/0014* (2013.01); *H04L 2027/0067* (2013.01); *H04L 2027/0032* (2013.01); *H04L 27/3818* (2013.01); *H04L 2027/0026* (2013.01); *H04L 2027/0055* (2013.01)
USPC .............................. 375/326; 375/324; 375/327

(58) Field of Classification Search
None
See application file for complete search history.

(56) References Cited

U.S. PATENT DOCUMENTS

| | | | |
|---|---|---|---|
| 6,493,409 B1 | 12/2002 | Lin et al. | |
| 6,560,294 B1 | 5/2003 | Gatherer | |
| 6,671,342 B2 | 12/2003 | Lin et al. | |
| 6,904,098 B1 | 6/2005 | Isaksen et al. | |
| 7,079,574 B2 * | 7/2006 | Rafie et al. | 375/232 |
| 7,327,819 B2 | 2/2008 | Lin et al. | |
| 7,532,822 B2 * | 5/2009 | Sun et al. | 398/155 |
| 2002/0126748 A1 * | 9/2002 | Rafie et al. | 375/229 |
| 2002/0176520 A1 * | 11/2002 | Heegard et al. | 375/327 |
| 2003/0058967 A1 | 3/2003 | Lin et al. | |
| 2004/0081257 A1 | 4/2004 | Lin et al. | |
| 2007/0036555 A1 * | 2/2007 | Chen et al. | 398/188 |
| 2009/0129787 A1 * | 5/2009 | Li et al. | 398/208 |
| 2009/0129788 A1 * | 5/2009 | Seimetz | 398/208 |
| 2009/0141831 A1 * | 6/2009 | Tao et al. | 375/325 |
| 2009/0142076 A1 * | 6/2009 | Li et al. | 398/208 |
| 2011/0217043 A1 * | 9/2011 | Pfau | 398/65 |

OTHER PUBLICATIONS

Jumpei Hongou, et al., "1 Gsymbol/s, 64QAM Coherent Optical Transmission Over 150 km With a Spectral Efficiency of 3 bit/s/HZ", in Proc. OFC'07m, Anaheim, 2007, OMP3.

Yojiro Mori, et al., "200-km Transmission of 100-Gbit/s 32-QAM Dual-Polarization Signals using a Digital Coherent Receiver", in ECOC'08, Paper 8.4.6.

(Continued)

*Primary Examiner* — Shuwang Liu
*Assistant Examiner* — Gina McKie
(74) *Attorney, Agent, or Firm* — Hoffmann & Baron, LLP

(57) ABSTRACT

The present disclosure provides a method of carrier phase error removal associated with an optical communication signal. The method includes estimating and removing a first phase angle associated with an information signal using coarse phase recovery, the information symbol being associated with a digital signal, the digital signal representing the optical communication signal; estimating a carrier frequency offset between a receiver light source and a transmitter light source by using the estimated first phase angle, the carrier frequency offset being associated with the information signal; removing carrier phase error associated with the carrier frequency offset; and estimating and removing a second phase angle associated with the information signal, the estimated second phase angle being based on the estimated first phase angle and the estimated carrier frequency offset.

20 Claims, 13 Drawing Sheets

(56) References Cited

OTHER PUBLICATIONS

X. Zhou, et al., "32Tb/s (320×114Gb/s) PDM-RZ-8QAM Transmission Over 580km of SMF-28 Ultra-Low-Loss Fiber", in Proc. OFC'09, PDPB4.

P.J. Winzer, et al., "112-Gb/s Polarization-Multiplexed 16-QAM on a 25-GHz WDM Grid", in Proc. ECOC'08, Sep. 2008, paper Th.3.E.5.

X. Zhou, et al., "200 Gb/s PDM-16QAM Generation Using a New Synthesizing Method", paper 10.3.5.

A. Sano, et al., "240-Gb/s Polarization-Multiplexed 64-QAM Modulation and Blind Detection Using PLC-LN Hybrid Integrated Modulator and Digital Coherent Receiver", ECO2009, PD2.2.

X. Zhou, et al., "Multi-Level, Multi-Dimensional Coding for High-Speed and High Spectral-Efficiency Optical Transmission", J. Lightwave Technology, vol. 27, No. 16, pp. 3641-3653, Aug. 2009.

A. Tarighat, et al., "Digital Adaptive Phase Noise Reduction in Coherent OpticalLinks", J. Lightwave Technology, vol. 24, No. 3, pp. 1269-1276, Mar. 2006.

H. Louchet, et al., "Improved DSP Algorithms for Coherent 16-QAM Transmission", in Proc. ECOC'08, Brussels, Belgium, Sep. 21-25, 2008, Tu.1.E.6.

M. Seimetz, "Laser Linewidth Limitations for Optical Systems with High-Order Modulation, Employing Feed Forward Digital Carrier Phase Estimation", in Proc. OFC/NFOEC'08, San Diego, CA, Feb. 24-28, 2008, OTuM2.

T. Pfau, et al., "Hardware-Efficient Coherent Digital Receiver Concept with Feed-Forward Carrier Recovery for M-QAM Constellations", Journal of Lightwave Technology, vol. 27, No. 8, Apr. 15, 2009.

J.G. Proakis, Digial Communications, 4th Edition, Chapter 6, pp. 348.

I. Fatadin "Compensation of Frequency Offset for Differentially Encoded 16- and 64-QAM in the Presence of Laser Phase Noise", IEEE Photonics Technology Letters, vol. 22, No. 3, Feb. 1, 2010.

Z. Tao et al., "Simple, Robust, and Wide-Range Frequency Offset Monitor for Automatic Frequency Control in Digital Coherent Receivers", ECOC 2007, paper 03.5.4.

A. Leven et al., "Frequency Estimation in Intradyne Reception," IEEE Photonics Technology Letters, vol. 19, No. 6, Mar. 15, 2007.

Y. Cao et al., "Frequency Estimation for Optical Coherent MPSK System Without Removing Modulated Data Phase," IEEE Photonics Technology Letters, vol. 22, No. 10, May 15, 2010.

* cited by examiner

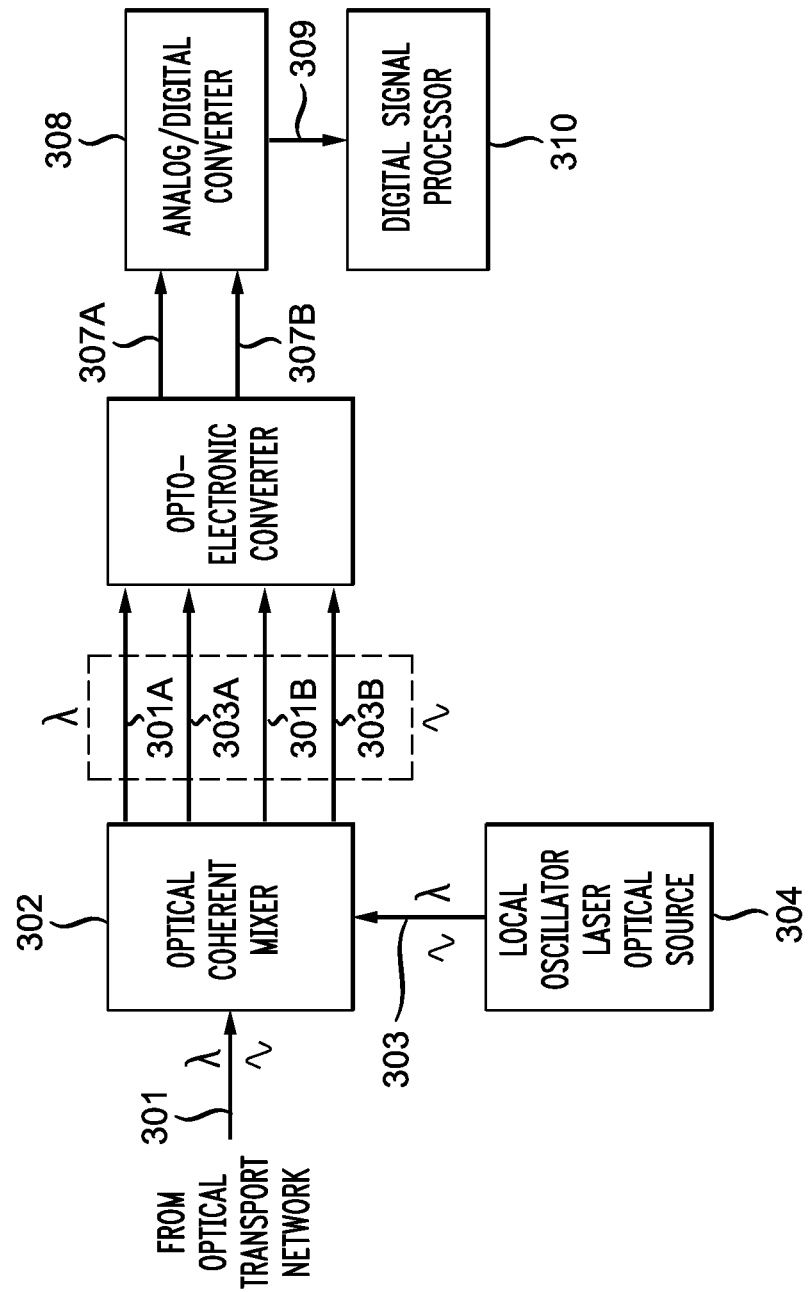

COMPLEXITY REDUCED FEED FORWARD CARRIER RECOVERY METHODS FOR M-QAM MODULATION FORMATS

BACKGROUND

1. Field

The present disclosure relates generally to optical communications, and more particularly to using the carrier phase angles recovered from the coarse phase recovery stage to estimate and remove carrier frequency offset for a carrier system.

2. Brief Description of the Related Art

In order to meet growing capacity demands in core optical networks, spectrally efficient techniques, such as digital coherent detection, have attracted recent attention. These techniques allow the use of advanced modulation formats; especially M-ary quadrature amplitude modulation (QAM) modulated systems. However, one major challenge in implementing high-performance coherent detection is in accurate phase and frequency offset recovery, which is caused by intrinsic laser phase noise and signal-local oscillator frequency offset. As a result, for high-order M-QAM modulation formats (where M>4), tolerance to laser phase noise decreases as the modulation level increases, because the Euclidean distance decreases (Yu, X. Zhou and J., "Multi-level, Multi-dimensional Coding for High-Speed and High Spectral-Efficiency Optical Transmission." to be published in the August issue of J. Light wave Technology, 2009). In particular, while frequency offset is relatively slow-changing, phase drift caused by laser phase noise (characterized by laser linewidth) is fast-changing. Given the small tolerance of high-order M-QAM systems to phase and frequency noise, the quality of phase tracking significantly influences performance of the communication system.

Presently, there are three published carrier phase recovery schemes. The first is a decision-directed digital feedback loop (Irshaad Fatadin, David Ives, Seb J. Savory., "Compensation of Frequency Offset for Differentially encoded 16- and 64-QAM in the presence of laser phase noise." *IEEE Photonics Technology Letters*. Feb. 1, 2010, p. 2010; H. Louchet, K. Kuzmin, and A. Richter., *Improved DSP algorithms for coherent 16-QAM transmission*, Brussels, Belgium: Tu.1.E.6, 2008. Proc. ECOC'08. pp. Sep. 21-25, 2008; A. Tarighat, R. Hsu, A. Sayed, and B. Jalali., *Digital adaptive phase noise reduction in coherent optical links*, J. Lightw. Technol., vol. 24, no. 3, March 2006, pp. 1269-1276). Since this method relies on negative feedback, its performance depends heavily on the ability of previous samples to be relatively current, which places demands on the sampling frequency. This is especially a problem in parallel and pipeline architectures, in which sampling is both sparse and delayed.

The second method uses a classic feed-forward phase correction technique based on an Mth-power Viterbi-Viterbi algorithm, in which the phase quadrant information is deliberately removed to calculate phase error (Seimetz, M., "Laser linewidth limitations for optical systems with high-order modulation employing feed forward digital carrier phase estimation." San Diego, Calif.: OTuM2, Feb. 24-28, 2008. Proc. OFC/NFOEC). However, this method can only be applied to certain constellation points having equal phase spacing, and therefore only a small subset of incoming signals can be used—this again reduces the linewidth tolerance of the system.

A third method proposes using a blind exhaustive phase search to find phase error based on the phase distance to the nearest constellation point, for a collection of points (T. Pfau, S. Hoffmann and R. Noé., *Hardware-Efficient Coherent Digital Receiver Concept With Feed-forward Carrier Recovery for M-QAM Constellations*, Journal of Lightwave Technology, Vol. 27, No. 8, Apr. 15, 2009). While this method is both feed-forward and high-performing, it requires high complexity to process a large collection of points simultaneously. In addition, because of the need to process in parallel, each group of computations required to process the collection of points must be repeated for each parallel branch. Therefore, though this method is high-performing, it is not feasible to implement.

SUMMARY

The present disclosure includes a method to use a decision-directed digital phase lock loop (PLL), which may be implemented with parallel and pipeline architecture, for coarse phase recovery, and one or more feed forward maximum likelihood (ML) estimators to fine-tune the estimate. Additionally, the use of a weighted ML phase estimator for improved performance is contemplated. For the case with carrier frequency offset between the transmitter laser and the local oscillator laser, the present disclosure proposes to use the carrier phase angles recovered from the coarse phase recovery stage to estimate and remove carrier phase angles recovered from the coarse phase recovery stage to estimate and remove carrier frequency offset. Specifically, the present disclosure proposes a novel time-domain edge detection algorithm to perform carrier frequency recovery prior to the ML phase estimator. The method of the present disclosure performs well even for a highly parallelized system, and the required computational efforts can be reduced by one order of magnitude as compared to the prior art using single-stage based blind phase search method.

Further, the present disclosure includes a method of carrier phase error removal associated with an optical communication signal. The method includes estimating and removing a first phase angle associated with an information signal using coarse phase recovery, the information symbol being associated with a digital signal, the digital signal representing the optical communication signal; estimating a carrier frequency offset between a receiver light source and a transmitter light source by using the estimated first phase angle, the carrier frequency offset being associated with the information symbol; removing carrier phase error associated with the carrier frequency offset; and estimating and removing a second phase angle associated with the information symbol, the estimated second phase angle being based on the estimated first phase angle and the estimated carrier frequency offset. Estimating and removing the first phase angle may include estimating the first phase angle using a decision-directed phase-locked loop, a decision-aided feedback phase recovery method, or estimating the first phase angle using a coarse blind phase search. Estimating and removing the second phase angle may include performing a maximum likelihood estimate based on the estimated first phase angle and the estimated carrier frequency offset, or estimating an average phase rotation based on the estimated first phase angle and the estimated carrier frequency offset. The method may further include estimating and removing a third phase angle associated with the information symbol, the third phase angle being based on the estimated second phase angle and the estimated carrier frequency offset. Estimating and removing the third phase angle may include performing a maximum likelihood estimate to generate a maximum likelihood estimator used to adjust the estimated carrier frequency offset based on the estimated second phase angle.

Additionally, the present invention includes an apparatus for carrier phase error removal associated with an optical communication signal. The apparatus includes a processing device having a processor and a receiver. The receiver receives an information symbol being associated with a digital signal, the digital signal representing the optical communication signal. The processor is configured to estimate and remove a first phase angle associated with an information symbol using coarse phase recovery, an information symbol being associated with a digital signal, the digital signal representing the optical communication signal, the processing device being configured to estimate a carrier frequency offset between a receiver light source and a transmitter light source by using the estimated first phase angle, the carrier frequency offset being associated with the information symbol, the processing device being configure to remove carrier phase error associated with the carrier frequency offset, the processing device being configure to estimate and remove a second phase angle associated with the information symbol, the estimated second phase angle being based on the estimated first phase angle and the estimated carrier frequency offset.

Further, the present disclosure includes a non-transitory computer-readable storage medium storing computer instructions that, when executed by a processing device, perform a carrier phase error removal associated with an optical communication signal. The instructions include estimating and removing a first phase angle associated with an information symbol using coarse phase recovery, the information symbol being associated with a digital signal, the digital signal representing the optical communication signal; estimating a carrier frequency offset between a receiver light source and a transmitter light source by using the estimated first phase angle, the carrier frequency offset being associated with the information symbol; removing carrier phase error associated with the carrier frequency offset; and estimating and removing a second phase angle associated with the information symbol, the estimated second phase angle being based on the estimated first phase angle and the estimated carrier frequency offset.

BRIEF DESCRIPTION OF THE DRAWINGS

The drawings constitute a part of this specification and include exemplary embodiments, which may be implemented in various forms. It is to be understood that in some instances various aspects may be shown exaggerated or enlarged in the drawings to facilitate understanding of the embodiments.

FIG. 3 shows a schematic of an optical receiver;

DETAILED DESCRIPTION

There is a need for further reducing the implementation complexity of carrier recovery for high-order M-QAM system. Moreover, the single-stage, blind-phase search algorithm and multi-stage algorithm do not consider carrier frequency offset (the frequency offset between the signal source and the local oscillator). However, in the real world, significant carrier frequency offset (>10 MHz) may occur in many cases, especially for long-haul transmission systems using intradyne detection and coarse automatic frequency tracking techniques (Z. Tao, H. Zhang, A. Isomura, L. Li, T. Hoshida, J. C. Rasmussen, "Simple, Robust, and Wide-Range Frequency Offset Monitor for Automatic Frequency Control in Digital Coherent Receivers," ECOC 2007, paper 03.5.4). Thus, a carrier recovery method capable of recovering the carrier phase in the presence of carrier frequency offset is also needed.

Figure 1:
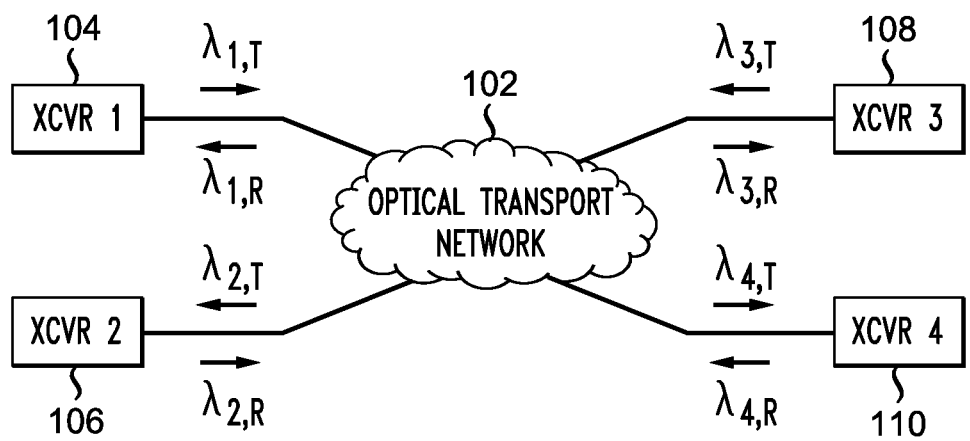
FIG. 1 shows a schematic of a generic optical communications system.

FIG. 1 shows a schematic of a generic optical telecommunications system. Multiple optical transceivers (XCVRs) send and receive lightwave signals via optical transport network 102. Shown are four representative transceivers, referenced as XCVR 1 104, XCVR 2 106, XCVR 3 108, and XCVR 4 110, respectively. In some optical telecommunications systems, optical transport network 102 can include all optical components. In other optical telecommunications systems, optical transport network 102 can include a combination of optical and optoelectronic components. The transport medium in optical transport network 102 is typically optical fiber; however, other transport medium (such as air, in the case of free-space optics) can be deployed.

Each transceiver has a corresponding transmit wavelength ($\lambda T n 1$) and a corresponding receive wavelength ($\lambda R n 1$), where n=1-4. In some optical telecommunications systems, the transmit and receive wavelengths for a specific transceiver are the same. In other optical telecommunications systems, the transmit and receive wavelengths for a specific transceiver are different. In some optical telecommunications systems, the transmit and receive wavelengths for at least two separate transceivers are the same. In other optical telecommunications systems, the transmit and receive wavelengths for any two separate transceivers are different.

Figure 2:
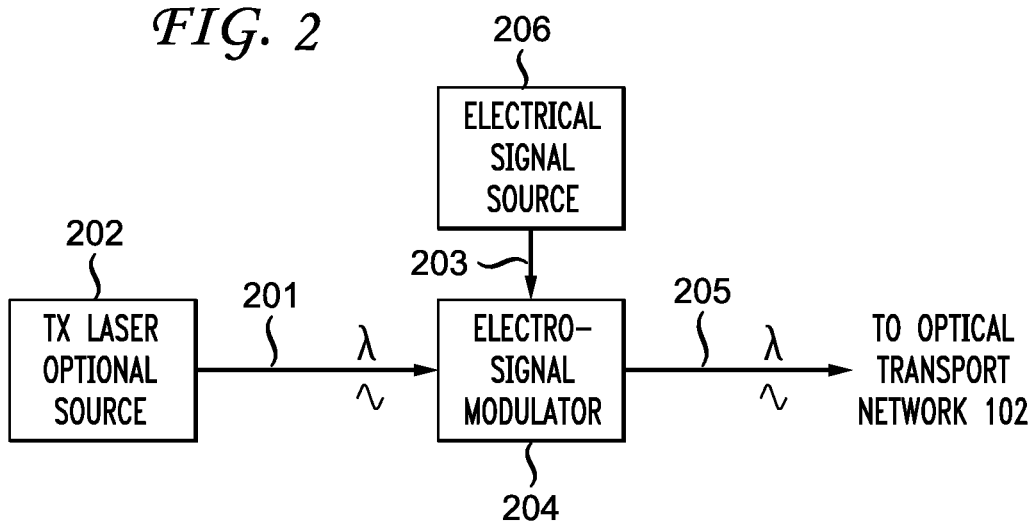
FIG. 2 shows a schematic of an optical transmitter.

FIG. 2 shows a schematic of an example of an optical transmitter. Transmit (Tx) laser optical source 202 transmits a continuous wave (CW) optical beam 201 (with wavelength 1) into electro-optical modulator 204, which is driven by electrical signal 203 generated by electrical signal source 206. Electrical signal 203 consists of an electrical carrier wave modulated with information symbols (data symbols). The output of electro-optical modulator 204 is carrier optical beam 205, which consists of a corresponding optical carrier wave modulated with information symbols. In general, the amplitude, frequency, and phase of the optical carrier wave can be modulated with information symbols. Carrier optical beam 205 is transmitted to optical transport network 102 (see FIG. 1).

FIG. 3 shows a schematic of an example of an optical receiver. Carrier optical beam 301, with wavelength 1, is received from optical transport network 102 (see FIG. 1). Carrier optical beam 301 has an optical carrier wave modulated with information symbols. In general, the optical receiver determines the amplitude, frequency, and phase of the modulated optical carrier wave to recover and decode the information symbols. Carrier optical beam 301 is transmitted into optical coherent mixer 302. Local oscillator laser optical source 304 generates a reference optical beam 303, with wavelength 1, modulated with an optical reference wave with tunable reference amplitudes, reference frequencies, and reference phases. Reference optical beam 303 is transmitted into optical coherent mixer 302.

Optical coherent mixer 302 splits carrier optical beam 301 into carrier optical beam 301A and carrier optical beam 301B. Optical coherent mixer 302 splits reference optical beam 303 into reference optical beam 303A and reference optical beam 303B, which is phase-shifted by 90 degrees from reference optical beam 303A. The four optical beams are transmitted into optoelectronic converter 306, which contains a pair of photodetectors (not shown). One photodetector receives carrier optical beam 301A and reference optical beam 303A to generate analog in-phase electrical signal 307A. The other photodetector receives carrier optical beam 301B and reference optical beam 303B to generate analog quadrature-phase electrical signal 307B. Analog inphase electrical signal 307A and analog quadrature-phase electrical signal 307B are transmitted into analog/digital converter (ADC) 308. The output of ADC 308, represented schematically as a single digital stream, digital signal 309, is transmitted into digital signal processor 310. Digital signal processor 310 performs multiple operations, including timing synchronization, equalization, carrier frequency recovery, carrier phase recovery, and decoding.

The carrier phase recovery refers to estimating and removing the phase error caused by inherent laser phase noise as well as the unknown transmission delay from the information symbol. Carrier frequency recovery refers to estimating and removing the phase error caused by carrier frequency offset (or difference) between the transmitter laser source and the receiver laser source from the information symbol. The information symbol refers to the physical representation of a digital signal such as the binary-modulated signal symbol. QAM-modulated signal symbol in the electrical field form. Coarse phase recovery refers to not very accurate phase recovery. The first phase angle refers to the estimated phase deviation of the received information symbol based on the coarse phase recovery. The second phase angles refers to the phase deviation of the received information symbol based on the second refined phase recovery.

An optical signal degrades as it propagates from the optical transmitter to the optical receiver. In particular, laser phase noise introduces some uncertainty in the carrier phase of the received signal relative to the carrier phase of the transmitted signal assuming no laser phase noise. Carrier phase recovery refers to recovery of the correct carrier phase (carrier phase as originally transmitted assuming no laser phase noise) from the received signal. In practice, a best estimate of the carrier phase is determined from the received signal such that a decoded information symbol at the receiver is a best estimate of the corresponding encoded information symbol at the transmitter. Carrier phase recovery determines the phase angle by which an initial decoded information signal is rotated to yield the best estimate of the corresponding encoded information signal.

Figure 4A:
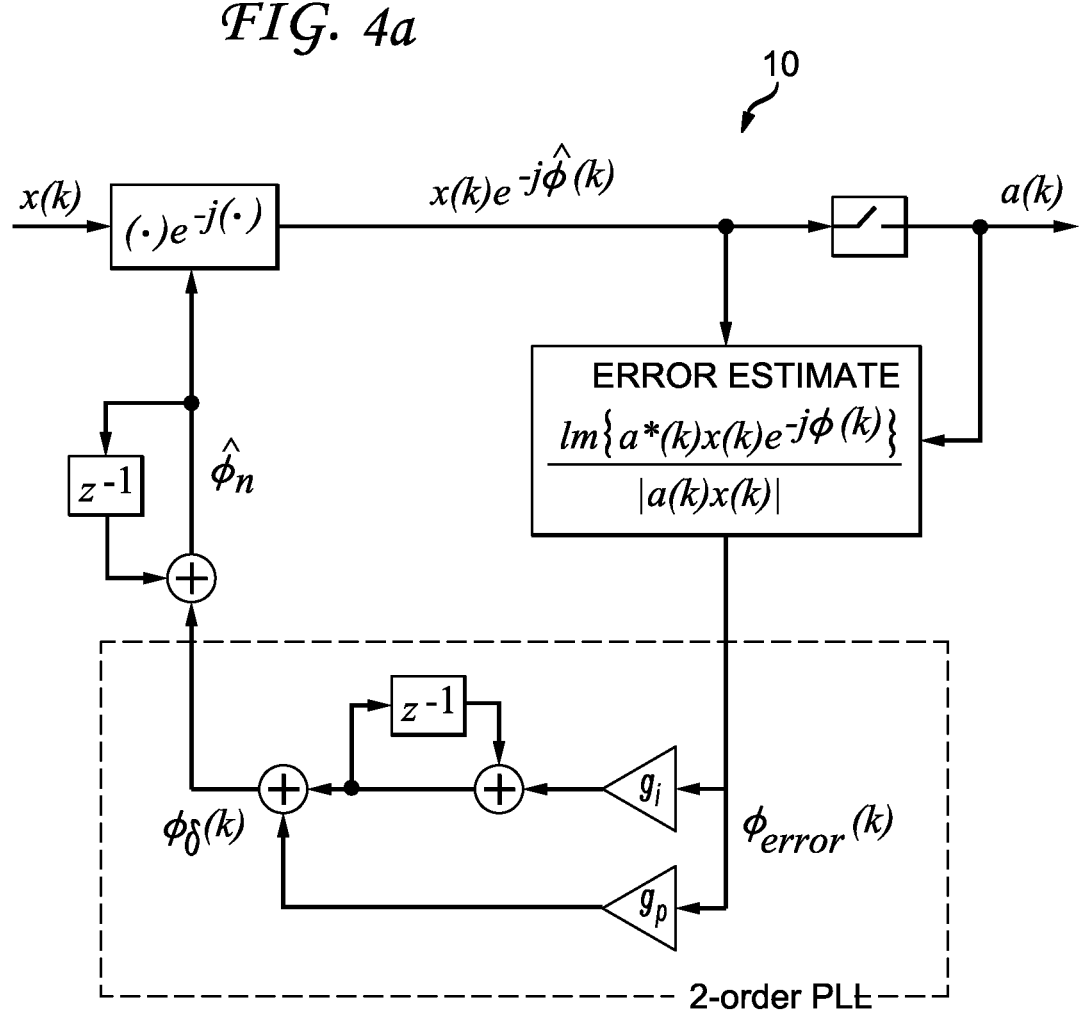
FIG. 4a is a block diagram of a second-order decision-directed phase locked loop (PLL).
Figure 4B:
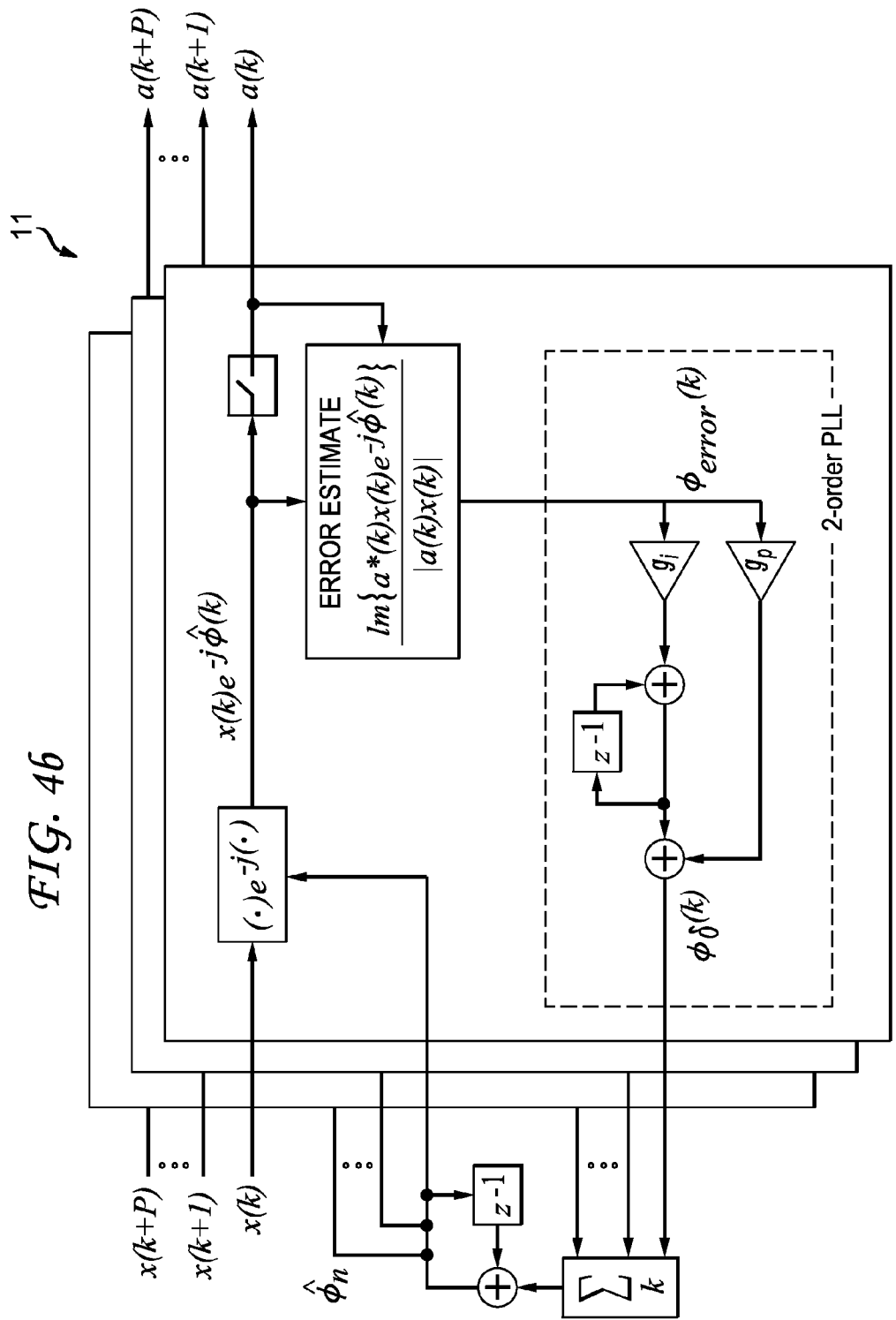
FIG. 4b is a block diagram of a second order decision directed phase-locked loop (DD-PLL) with k parallel branches.

FIGS. 4a and 4b show block diagrams 10, 11 of a decision-directed second-order digital phase lock loop (PLL) 10 and its parallel form 11, respectively, which are based on a system described in "Compensation of Frequency Offset for Differentially encoded 16- and 64-QAM in the presence of laser phase noise", by Irshaad Fatadin, David Ives, Seb J. Savor., *IEEE Photonics Technology Letters*. Feb. 1, 2010, p. 2010. The presently claimed embodiment would benefit these systems as discussed below in detail.

The feedback phase error $\Phi^{error}$ is calculated as follows:

$$\Phi_{error}(k) = \frac{\text{Im}\{\hat{a}_k^* \cdot y_k e^{-j\Delta\Phi(k)}\}}{|\hat{a}_k^* \cdot y_k|} \quad (1)$$

where k is the time index, $y_k$ is the kth received sample (one sample per symbol, after equalization), $\hat{a}_k^*$ is the conjugate of the kth decided bit, and $\Delta\Phi(k)$ is the kth estimated phase offset. Here, $y_k e^{-j\Delta\Phi(k)}$ is the received sample with phase correction based on an estimated phase offset. By multiplying $y_k e^{-j\Delta\Phi(k)}$ with $\hat{a}_k^*$, any phase information encoded in the sample is removed, and the symbol is rotated to the x-axis. Any deviation of this result from the x-axis is, therefore, representative of the error in phase estimation. For small angles, $\Phi \approx \sin(\Phi)$. Thus, to simplify calculations, the angle is estimated by measuring the imaginary component, and normalizing for magnitude scaling. This normalization is not present in the prior art (i.e., Irshaad Fatadin, David Ives, Seb J. Savory., "Compensation of Frequency Offset for Differentially encoded 16- and 64-QAM in the presence of laser phase noise." *IEEE Photonics Technology Letters*. Feb. 1, 2010, p. 2010). However, this normalization of the presently claimed embodiment significantly improves the performance of the phase-locked loop (PLL).

The remaining PLL equations are as follows:

$$\Phi_i(k) = \Phi_i(k-1) + g_i \Phi_{error}(k) \quad (2)$$

$$\Phi_\delta(k+1) = g_p \Phi_{error}(k) + \Phi_i(k) \quad (3)$$

$$\Delta\Phi(k+1) = \Delta\Phi(k) + \Phi_\delta(k+1) \quad (4)$$

$$\hat{a}_k = y_k e^{-j\Delta\Phi(k)} \quad (5)$$

The PLL can only be used for coarse phase recovery. This is because the PLL performance relies heavily on negative feedback, and therefore used for dense sampling. However, in order to support high optical data rates (greater than 10 Gbaud), electronic processing has to be parallelized, and therefore must rely on sparse sampling.

Figure 5:
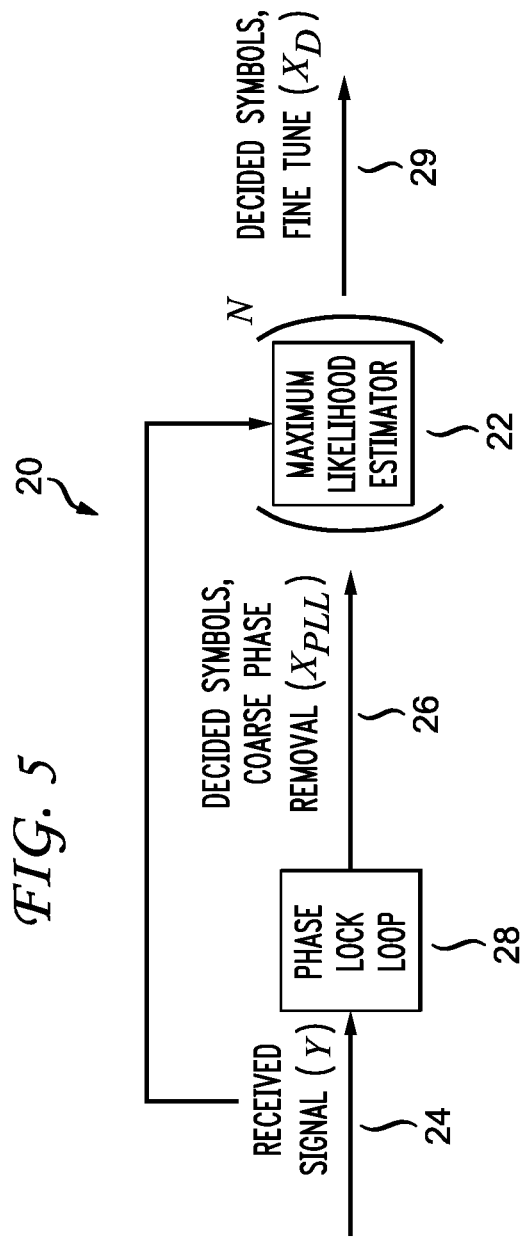
FIG. 5 is a block diagram of a first embodiment in accordance with the present disclosure.
Figure 6:
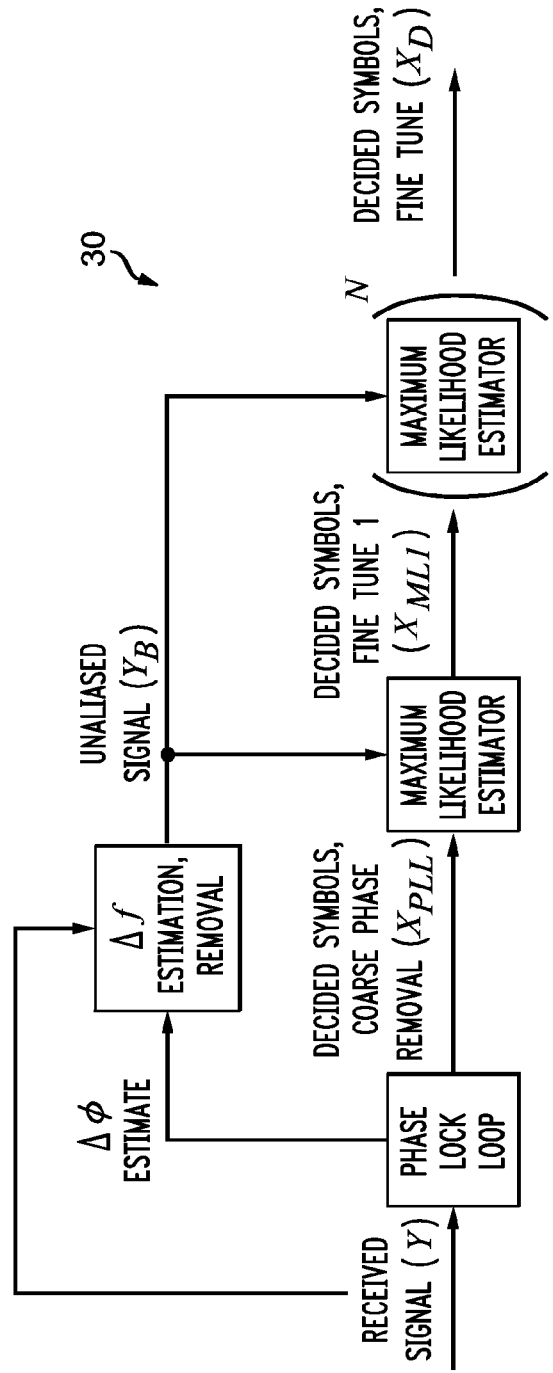
FIG. 6 is a block diagram of a second embodiment in accordance with the present disclosure.

FIG. 5 and FIG. 6 describe PLL-based phase recovery method. PLL is the preferable coarse phase recovery method in accordance with the present disclosure due to its hardware efficiency. Specifically, FIG. 5 shows the basic scheme 20 of the present disclosure, which relies on a series of maximum likelihood (ML) phase estimators 22 to adjust the phase offset and improve the bit error ration (BER). Because the ML phase estimator 22 is a feed-forward method, its performance does not degrade due to system parallelization.

The ML phase estimator 22 is implemented as follows (Proakis, J. G., *Digital Communications*, 4th edition, Chapter 6, pp. 348):

$$H(k) = Y(k) \cdot X^*_{old}(k) \quad (6)$$

$$H_{k,k+1,\ldots,k+P-1} = H(k) + H(k+1) + \ldots + H(k+P-1) \quad (7)$$

$$\Delta\Phi_{MLE}(k, k+1, \ldots, k+P-1) = \tan^{-1}\left(\frac{Im\{H_{k,k+1,\ldots,k+P-1}\}}{Re\{H_{k,k+1,\ldots,k+P-1}\}}\right) \quad (8)$$

$$X_{new}(k) = Y(k) \cdot e^{-j\Delta\Phi(k)}_{new} \quad (9)$$

Here, Y(k), and $X_{old}$(k) denote the kth received sample 24 (before carrier recovery) and the decided symbol from the previous coarse phase recovery stage 26, respectively, and $X_{new}$(k) and $\Delta\Phi_{MLE}$(k) are the newly decided symbol and phase offset, respectively. For each ML phase estimator 22, the decided symbols of the previous stage are used as a reference. Through simulation, this cascade works best with two or fewer stages, as performance quickly reaches a BER floor.

The performance of the ML phase estimator 22 can be improved by weighting the phase estimates inversely to the magnitudes of the symbols, due to the fact that symbols further from the origin have a higher probability of error, and therefore contribute more to phase error. A weighted ML phase estimator is implemented by substituting H(k) in with $$H_w(k) = \frac{Y(k) \cdot X^*_{old}(k)}{|x_{old}(k)| + d} \quad (10)$$

where, d is a very small number to prevent division by 0. For systems with only one ML phase estimator, this normalization step will improve performance. However, for cascaded ML systems, the improvement may not be significant.

For a highly parallelized system of FIG. 5, the above discussed PLL 28 and ML phase estimator 22 multistage solution works well only for the case with no carrier frequency offset or with very small carrier frequency offset. Its performance degrades when frequency offset is present. This is because the ML phase estimator 22 acts as a smoothing filter, and will attempt to remove the slope in $\Delta\hat{\phi}$ caused by the frequency offset $\Delta f$. To address this problem, estimation and removal of this frequency offset is proposed prior to the ML phase estimation 22 by using the estimated phase offset 29 from the first PLL coarse phase recovery stage 28. A time-domain edge detection algorithm of the present disclosure performs such carrier frequency offset estimation. This frequency offset estimation method in general can also be used in the case that the first phase recovery stage employs different coarse phase recovery methods (e.g. the coarse blind phase search method). In addition, although the proposed time-domain edge detection based frequency detection method has the advantage of simple implementation, more complicated fast-fourier-transform (FFT) based method or time-domain phase slope based method may also be employed to detect the carrier frequency offset by using the recovered carrier phase angles obtained from the first coarse phase recovery stage.

Although phase offset changes quickly, frequency offset changes slowly, and can be corrected on a separate time scale than phase offset. This is an additional advantage, in that frequency estimation can be performed on a much slower timescale, thereby decreasing complexity. The schematic illustration for the proposed carrier recovery 30 method with the presence of carrier frequency offset is shown in FIG. 6.

The coarse phase recovery shown in FIGS. 6a-6d is not limited to PLL, other phase estimation methods such as the blind phase search based methods or the decision-aided feedback phase recovery method reported in IEEE PHOTONICS TECHNOLOGY LETTERS, VOL. 21, NO. 19, Oct. 1, 2009, entitled "Parallel Implementation of Decision-Aided Maximum-Likelihood Phase Estimation in Coherent-ary Phase-Shift Keying Systems," by S. Zhang, C.Yu, Member, P. Y. Kam, and J. Chen, may also be used as the coarse phase recovery method. The ML estimator shown in FIG. 6 corresponds to 2nd-stage refined phase recovery in FIG. 6a-6d. Although ML estimator is the preferable choice for the 2nd-stage refined phase recovery, some other phase estimators such as the known phase-range constrained blind phase search method may also be used in the second stage phase recovery.

Figure 6A:
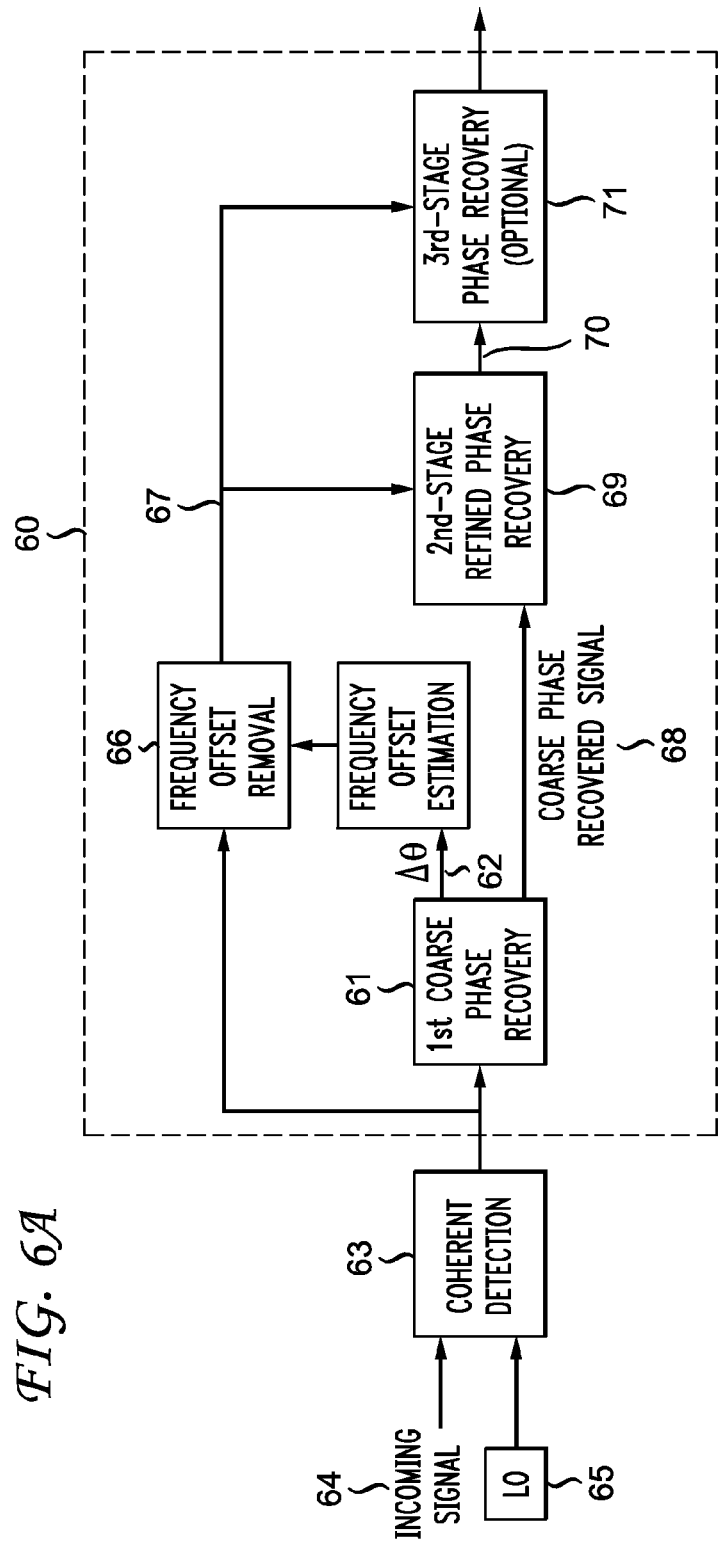
FIG. 6a is a high-level block diagram of the embodiment of FIG. 6.

FIG. 6a shows a high-level block diagram 60 of the embodiment shown in FIG. 6. In this embodiment, the carrier phase recovered from the first coarse phase recovery stage 61 is used as the input to a carrier frequency offset detection/estimation circuit 62, where the carrier frequency offset 63 between the incoming signal source 64 and the local oscillator light source 65 is estimated by either the proposed time-domain edge detection method or some other known carrier frequency offset detection methods such as the fast Fourier transform (FFT)-based frequency domain methods or time-domain phase slope detection based methods. The frequency offset of a copy of the original signal can then be removed 66 and the frequency offset-removed signal 67 along with the phase recovered signal 68 from the first coarse phase recovery stage 61 are then used as two inputs of the second-stage refined carrier recovery circuit 69 where a maximum likelihood (ML) based carrier phase estimation method or phase-constrained blind phase search method may be applied to do a more accurate carrier phase recovery. The phase recovered signal 70 from the second phase recovery stage 69 and a copy of the frequency-offset removed signal 67 can be further used as two inputs to the third carrier phase recovery circuit 71 to further refine the carrier phase recovery.

Figure 6B:
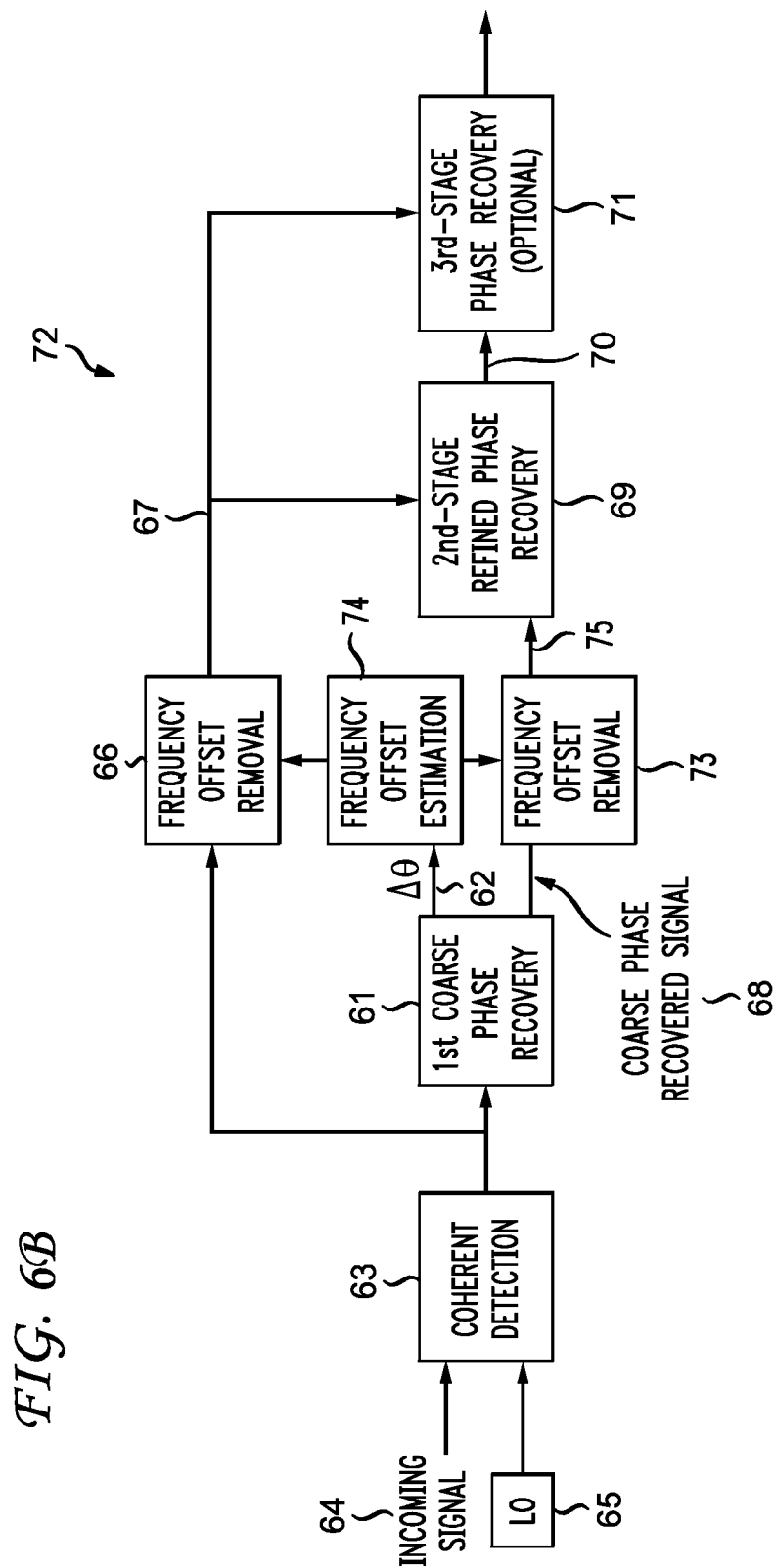
FIG. 6b is a high-level block diagram of the embodiment of FIG. 6.

FIG. 6b shows another embodiment of a high-level block diagram of FIG. 6. The second embodiment 72 is similar to embodiment 60 of FIG. 6a except that the phase-recovered signal 68 resulted from the first coarse phase recovery stage 61 is made to pass through a frequency offset removal circuit 73 before entering into the second phase recovery stage 69. The second embodiment 72 may achieve better performance than the first embodiment 60 if the coarse phase is estimated in a block-by-block basis (i.e. the carrier phase is assumed identical for all the symbols within the same block). For this case, carrier frequency offset 74 introduces an additional phase error 75 if without performing carrier frequency offset removal.

Figure 6C:
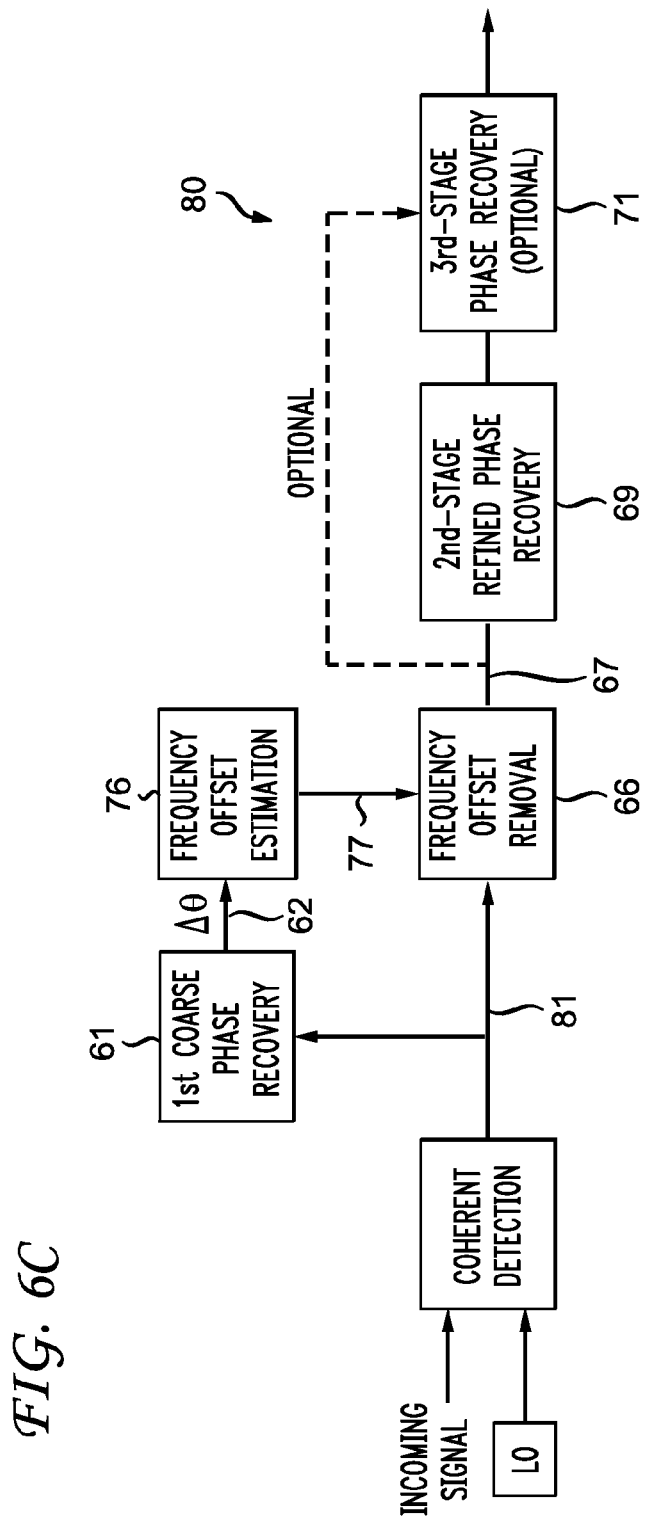
FIG. 6c is a block diagram of a third embodiment of FIG. 6 for carrier frequency offset estimation purpose.

FIG. 6c shows the third embodiment 80 of the present disclosure. For third embodiment 80, the coarse phase recovery circuits serve only for carrier frequency offset estimation purpose. The estimated carrier phase angles 62 from the coarse phase recovery circuit 61 is used for carrier frequency offset detection 76 but the coarse phase—recovered signal 77 does not pass to the second phase recovery stage 69, instead, the carrier frequency offset removal operation 66 is applied to the original signal 81 and then the frequency offset-removed signal 67 goes to the second phase recovery stage 69 and then the third phase recovery stage 71 for carrier phase recovery. This embodiment may achieve better performance than the first embodiment 60 and the second embodiment 72 when the frequency offset is significant.

Figure 6D:
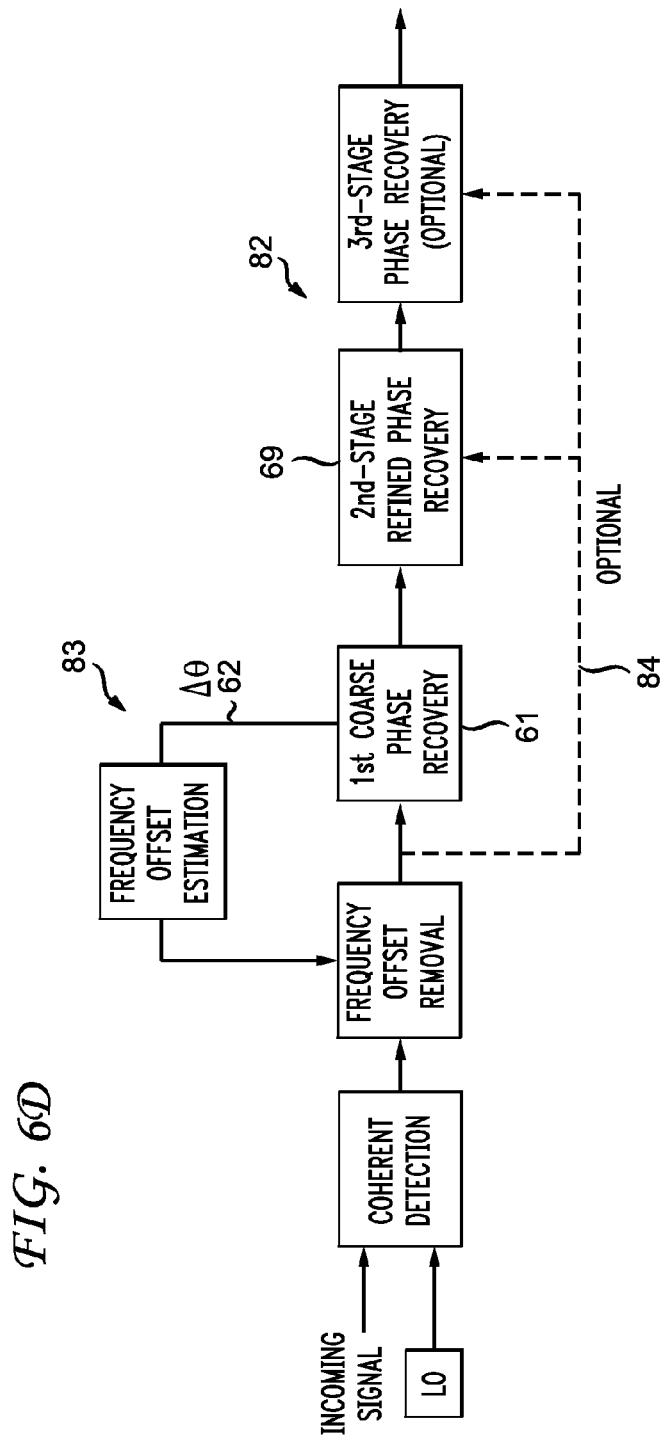
FIG. 6d is a block diagram of a fourth embodiment of FIG. 6 introducing a feedback configuration.

FIG. 6*d* shows that the fourth embodiment 82 is an improvement of the third embodiment 80 of FIG. 6*c* by introducing a feedback configuration 83 such that the phase recovered signal 62 from the first coarse phase recovery stage 61 can be used along signal 84 by the second phase recovery circuit 69 even for large carrier frequency offset. Note that if phase locked loop (DD-PLL) based methods are employed for the coarse phase recovery, the PLL may fail to lock for a large frequency offset. For this case, scanning of the frequency offset at the system acquisition stage (i.e. the starting stage) with a frequency step smaller than the maximum tolerable frequency offset of the PLL is done. Once the PLL can lock (i.e. the test frequency is within its locking range), the system can switch to the normal operation state.

The basic idea for the frequency offset estimation is to exploit the periodicity of the measured phase offset $\Delta\Phi$ caused by range-limiting the value to $[-\pi,\pi)$, eg:

$$\Delta\Phi = \mathrm{mod}(2\pi(\Delta f t + \Delta\Phi(t)), 2\pi) \tag{11}$$

Since $\Delta f t \gg \Delta\Phi(t)$ for most values of t, this modulo operation will cause the detected AO to resemble a nearly perfect sawtooth wave with frequency $\approx \Delta f$. Additionally, because of the sharp edges in a sawtooth wave, a simple edge detection technique can be used to find the average period of $\Delta\Phi$, thereby estimating $\Delta f$.

Figure 7:
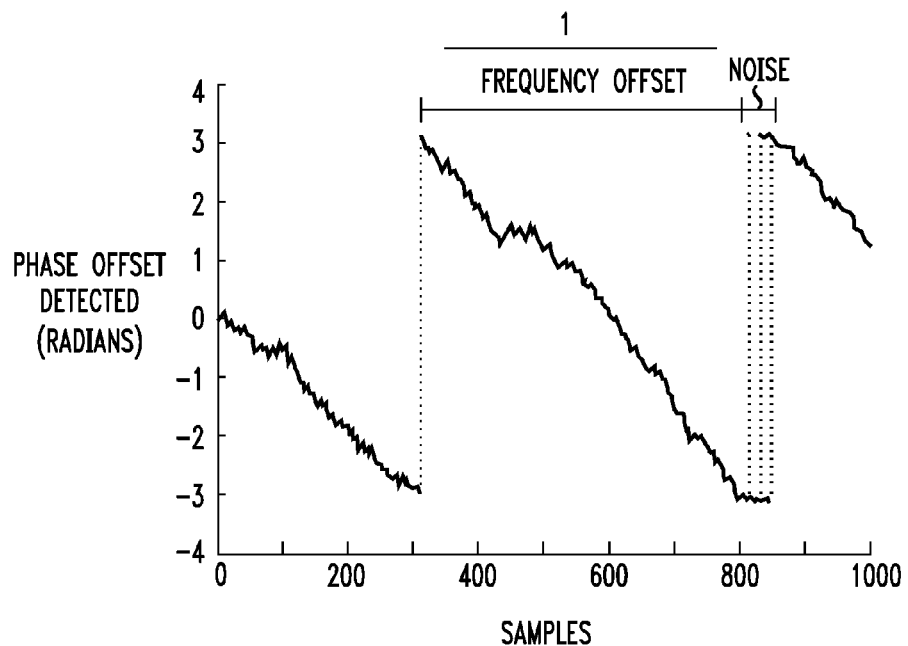
FIG. 7 is a plot diagram of phase offset detection of samples with a frequency offset of 1 MHz.

FIG. 7 is an example plot of $\Delta\Phi$ for $\Delta f = 1$ MHz. The measured period is very close to $1/\Delta f$; however, in instances with high jitter, one edge may manifest itself as several edges, which can be corrected. An example of a simple edge detection scheme is shown below, where K is the set of sample indices closest to each edge.

$$\delta[k] = \Delta\Phi[k] - \Delta\Phi[k-1] \tag{12}$$

$$K = \{k : |\delta[k]| > \pi\} \tag{13}$$

Because $\Delta f t \gg \Delta\Phi$, the sawtooth gives very sharp edges, making these frequency estimates very precise. However, as FIG. 7 also shows, there can sometimes be jitter in the system, causing one sawtooth edge to appear as a cluster of edges. If this is not corrected, the distance between edges within the cluster can skew the estimate dramatically. One way to identify edges caused by jitter is that these edges will be followed by an edge going the opposite direction. For example, an edge going from $\pi$ to $-\pi$ caused by jitter will be soon followed by an edge going from $-\pi$ to $\pi$. Therefore, of all the edges detected in K, the edges actually pertaining to the sawtooth, $K_c$, can be found as:

$$K_c = \{k \in K : \delta[k] + \delta[k-1] > 2\pi\} \tag{14}$$

Then, the average frequency magnitude can be found as $$d = \text{mean spacing in } K_c \tag{15}$$

$$|\Delta f| = \frac{d}{F_s} \tag{16}$$

where $F_s$ is the sampling frequency. The sign of the frequency can then be found by summing the slopes of the edges, or $$s = \mathrm{sign}\left(\sum_k \delta[k \in K]\right) \tag{17}$$

Frequency offset can then be estimated and removed:

$$\Delta f = s \cdot |\Delta f|$$

$$x_B = x e^{-2\pi\Delta f t} \tag{18}$$

where $x_B$ is the baseband transmit signal.

Figure 8:
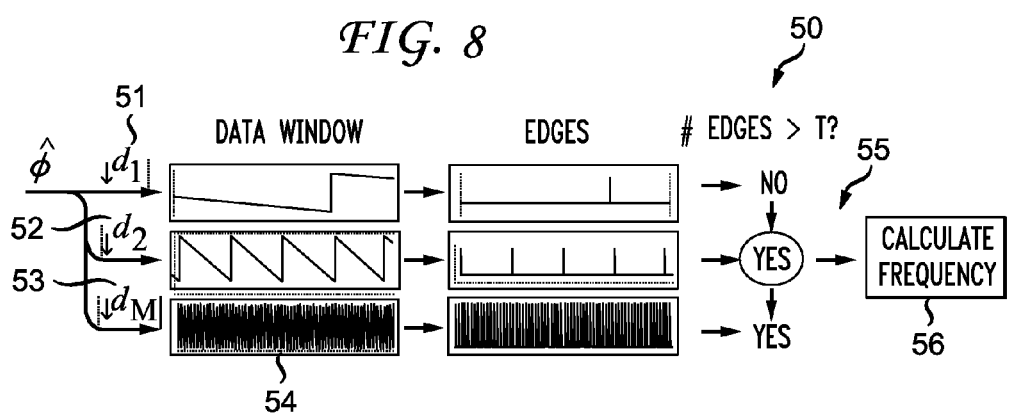
FIG. 8 is a block diagram of a multi-branch method for edge detection compatible with wide-range frequency detection.

Since this method includes additions and thresholding, the only major complexity comes from the number of samples L needed for good frequency estimation. For a 64 QAM system with 26 dB open-source cognitive radio (OSNR) or higher, it is possible to achieve a frequency precision of 1 MHz for the entire dynamic range with L=1000 samples by downsampling at the appropriate rate. This rate must be chosen such that the sampling window is wide enough to include two or more sawtooth periods, while also sampling dense enough that edges are detected closely. Since systems with more parallel branches can only sync to a smaller range of frequencies, a highly parallelized system can achieve good frequency estimation for the entire effective frequency range with a very small number of samples. For example, in a 64-QAM system and 100 kHz laser linewidth, with a PLL with 4 or more parallel branches, a sampling rate of 300 MHz for 1000 samples works well for all the possible frequency offsets in which the PLL will sync ($\leq 20$ MHz), and can consistently predict $\Delta f$ to within 1 MHz error. A PLL with fewer parallel branches can sync to higher frequencies, making it difficult to achieve frequency precision for the entire dynamic range with a small number of samples. In this case, a multi-branched method is used in which the estimation is done with multiple L-sample banks, all sampling the data at different rates. FIG. 8 shows a multi-branch method for edge detection compatible with wide-range frequency detection 50. Each branch 51, 52 and 53 then performs edge detection (Equations (12)-(14)) in parallel, and the best window 54 produces $K_c$ for Equation (15). In this case, the best window is the one with the densest sampling but includes more than T sawtooth edges ($\neq 3$). This method grows in complexity, in that it requires L×M samples, where M is the number of branches. However, in most cases, M is very small. In 64-QAM, for example, for fewer than 4 PLL branches, M=2 is sufficient to acquire 1 MHz accuracy in all effective frequency ranges ($\leq 100$ MHz). Here, the preferred choice for the two sampling rates is 300 MHz and 4.75 GHz.

The frequency offset estimate $\Delta f$ is removed from Y as follows:

$$Y_B = Y \cdot e^{-j\Delta f t} \tag{19}$$

After this, $Y_B$, a baseband version of Y, is fed into the ML phase estimation. For a sampling speed of 300 MHz and window of 1000 samples, the time needed to acquire each window is about 3.3 µs. This means that this method will consistently remove frequency offset correctly if the frequency offset changes at a rate of 300 kHz per microsecond or less. Typically, frequency offset changes much more slowly, in which case the frequency estimation can be applied less frequently.

In the above, a time domain edge detection solution 55 is used to decide both the magnitude and sign of the carrier frequency offset 56. Time-domain based solution 55 such as the one described in 'Frequency Estimation in Intradyne Reception", by A. Leven, N. Kaneda, U. V. Koc, Y. K. Chen, (See *IEEE Photonics Technology Letters*, Vol. 19, No. 6, Mar. 15, 2007) and an FFT based solution as described in "Frequency Estimation for Optical Coherent MPSK System Without Removing Modulated Data Phase," by Y. Cao, S. Yu, J.

Shen, W. Gu, Y. Ji (See *IEEE Photonics Technology Letters*, Vol. 22, No. 10, May 15, 2010) can also be used for carrier frequency offset estimation by using the phase offset output from the first stage PLL. The method of the present disclosure provides more accurate frequency offset estimation than the alternative time-domain based solution, which cannot provide good estimation for M-QAM based systems, where M>4. Additionally, the method of the present disclosure is much less complex than the FFT-based solutions, which requires at least a 2048-length FFT to achieve our performance level. In contrast, the method of the present disclosure requires 1000 or 2000 samples (depending on the number of PLL branches), and uses only additions and thresholding.

Although the above discussed time-domain edge detection method used the PLL to remove the data modulation and find the phase offset. Other data modulation-removing methods (such as the well known Mth-power algorithm used for phase-shifting key (M-PSK system) can also be used to find the phase offset. Once phase offset is found, the time-domain edge detection method can then be used to estimate the carrier frequency offset.

The effectiveness of these methods has been verified by numerical simulations of resulting BER for back-to-back transmission. In all cases, the following assumptions were made: the symbols constituted a square 64QAM constellation, transmitted at a baud rate of 38 Gsym/s, with an optical signal to noise ratio (OSNR) at 0.1 nm noise bandwidth to be 28 dB, and a laser linewidth of 100 kHz for both the signal source and local oscillator. At the receiver, the 3 dB electrical receiver bandwidth is 0.55×baud rate, sampling performed at 38 Gb/s (1 sample per symbol, after equalization), and receiver filtering effects is equalized by using a cascaded multi-modulus algorithm based adaptive equalizer (X. Zhou, J. Yu., 200-*Gb/s PDM*-16*QAM generation using a new synthesizing method*. s.1.: paper 10.3.5, 2009. ECOC) prior to carrier recovery. The resulting BER for these schemes are shown in FIGS. 9-11.

Figure 9:
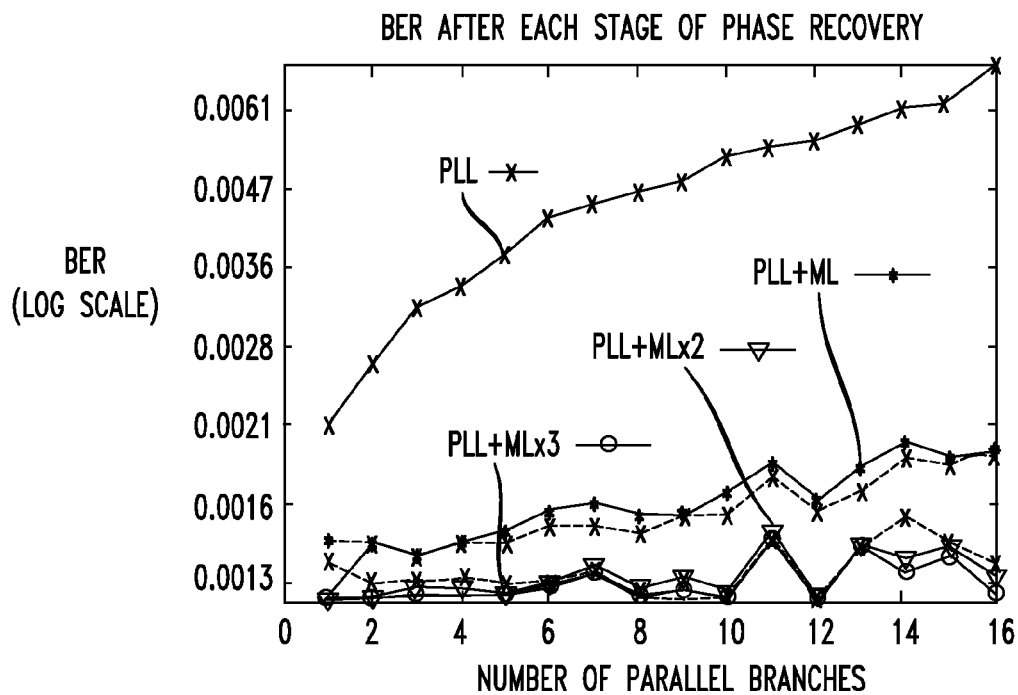
FIG. 9 is a plot diagram of simulated bit error ration (BER) as a function of a number of parallel branches with different phase recovery schemes, where there is no frequency offset in the system.

FIG. 9 shows the simulated BER performance versus the number of parallel branches for a cascaded PLL and ML system as illustrated in FIG. 5 for the case that there is no frequency offset in the system. Dashed lines are systems where ML phase estimators use weighted estimates. FIG. 9 shows that the BER performance of the PLL decreases as the number of parallel branches increase, showing that negative feedback systems do not perform well with many parallel branches. However, this degradation in performance is not apparent after two ML phase estimators, showing that our cascaded system works well with parallel systems despite the negative feedback PLL. The third ML phase estimator does not improve performance, showing that two ML phase estimators is optimal. Additionally, though a weighted ML phase estimator improves performance for one ML, the improvement is negligible when two or more ML phase estimators are cascaded. In the remaining figures, our system consists of a PLL, followed by two unweighted ML phase estimators.

Figure 10:
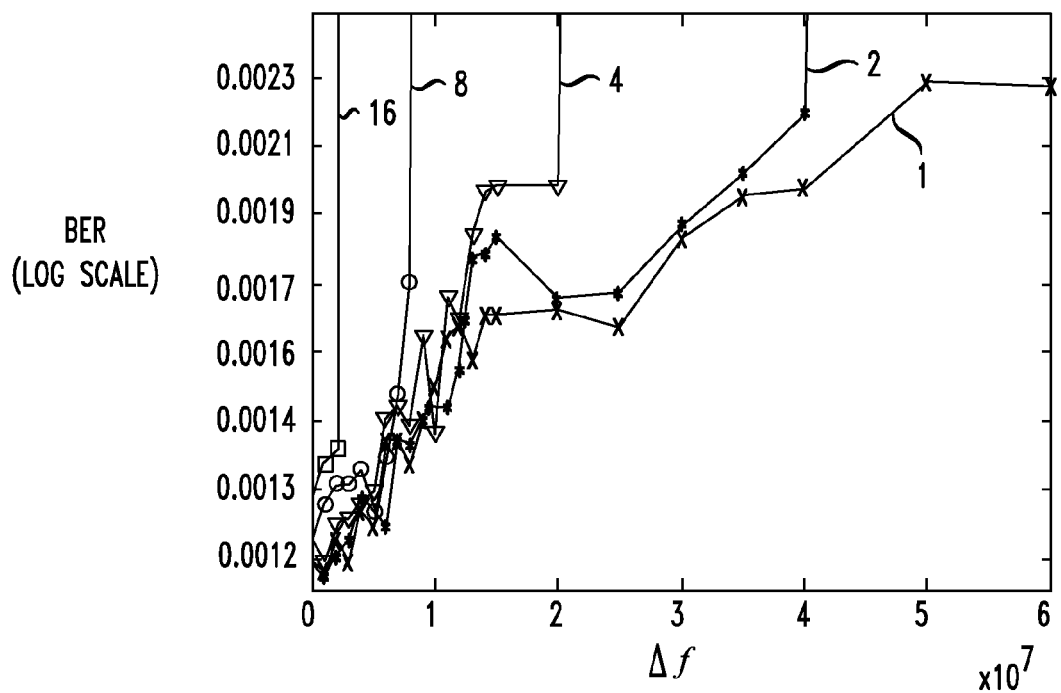
FIG. 10 is a plot diagram of simulated BER as a function of carrier frequency offset by using a three-stage PLL+2ML phase recovery method with a different number of parallel branches.

In FIG. 10, the embodiment in FIG. 5 is used in a receiver with phase and frequency offset. FIG. 10 shows the simulated BER versus carrier frequency offset by using three-stage PLL+2ML phase recovery method with different number of parallel branches. The labels show number of parallel PLL branches used. Here, the performance decreases for increasing frequency offset, for two reasons. For lower frequency offsets, the performance of the ML phase estimator degrades, resulting in a slowly rising BER. This results from the block implementation of the ML phase estimator, which attempts to filter out the frequency offset component of the phase detection. Additionally, for Δf too high, $\Delta\hat{\phi}$ changes too quickly, and the PLL cannot sync, causing the BER to jump to maximum error. This is especially a problem as the number of parallel branches increases, as the feedback delay is greater.

Figure 11:
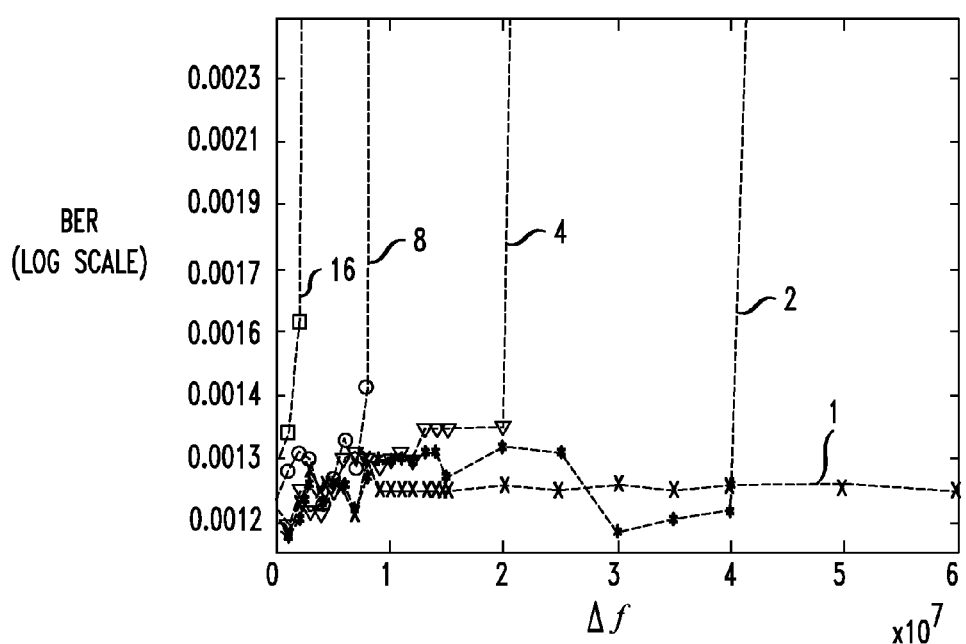
FIG. 11 is a plot diagram of simulated BER versus carrier frequency offset by using both phase (PLL+2ML) and frequency recovery methods.

In FIG. 11, the embodiment presented in FIG. 6 is used to mitigate frequency offset. By removing the frequency offset after the PLL, the performance degradation caused by the ML phase estimator smoothing effect is eliminated. However, because frequency removal depends on data from the PLL, it cannot help with the PLL's inability to sync to high-frequency systems. FIG. 11 shows simulated BER versus carrier frequency offset by using both phase (PLL+2ML) and frequency recovery method. The labels show number of parallel PLL branches used.

Overall, these plots show that the multistage PLL, frequency removal, and ML phase estimator can successfully perform phase recovery for low frequency offset. Although a highly parallelized PLL cannot sync to high frequency offsets, it is possible to use a PLL with fewer branches for systems with smaller frequency offsets, in which the performance is just as good as if there is no frequency offset at all. For a large frequency offset, an independent frequency recovery should be performed prior to the above discussed PLL/ML multi-stage phase recovery.

Additionally, the ML phase estimator stages can be replaced by other phase estimate methods. For example, the carrier phase can be estimated by directly calculating the average phase rotation of the original signal relative to the decoded signal obtained from the previous stage. In addition, the blind phase search method with refined/reduced phase scan range may also be used in the second and the third stages.

High-order M-QAM is the most promising modulation formats to realize high-spectral efficiency optical transmission at a data rate beyond 100-Gb/s. Because high-order M-QAM is very sensitive to laser phase noise, laser linewidth-tolerant and hardware-efficient feedforward carrier recovery method is critical important for practical implementation of these high-order modulation formats. So far, among all the published carrier recovery algorithms, only single-stage blind phase search method can achieve high laser linewidth tolerance. But the required computational efforts are very high for this method, especially for highly paralleled systems. The multi-stage method of the present disclosure can achieve high laser line-width tolerance (comparable to the blind phase search method because the method not only uses a feedforward configuration but also use the most current symbol for the phase estimate) with substantially lower implementation complexity. The reason that the method of the present disclosure has lower implementation complexity is due to the fact that the method of the present disclosure requires only one phase estimate in each of the two or three stages, while the blind phase search (BPS) method require many phase estimates.

For example, using 64QAM, the single stage BPS requires testing of more than 64 different phase angles (T. Pfau, S. Hoffmann and R. Noé., "Hardware-Efficient Coherent Digital Receiver Concept With Feed-forward Carrier Recovery for M-QAM Constellations." JOURNAL OF LIGHTWAVE TECHNOLOGY, VOL. 27, NO. 8, Apr. 15, 2009). Table 1 shows the hardware complexity required for one block of 2N symbols. In order to find one phase estimate, 64 such blocks are required.

TABLE 1

BPS complexity for 64 QAM system, for a single block of 2N symbols.

|  | Complex multiplier | Real multiplier | Real adder | Slicer | Other |
|---|---|---|---|---|---|
| BPS (×64) | 2N | 0 | 2N + 1 | 2N | 1 comparator, 2N selectors |
| Total | 128N | 0 | 128N + 64 | 128N | 64 comparator, 128N selectors |

In contrast, the multistage DD-PLL and ML scheme requires more hardware per 2N symbols (Table 2), but requires only one calculation per phase estimate. In this respect, this scheme has a complexity reduction of almost 10 times.

TABLE 2

DD-PLL with 2 ML phase estimators complexity for a 64 QAM system, for a single block of 2N symbols in phase recovery, and 2L symbols in a 2-branch frequency recovery.

|  | Complex multiplier | Real multiplier | Real adder | Slicer | Other |
|---|---|---|---|---|---|
| PLL | 2N | 4N | 6N | 2N |  |
| ML (×2) | 4N | 2N | 4N | 2N | Arctangent |
| Freq. removal |  |  | <8L | 2L |  |
| Total | 10N | 8N | 10N + 8L | 4N + 2L | Arctangent |

In addition to the complexity reduction for carrier phase recovery, the present disclosure also proposes a complexity-reduced frequency recovery method that essentially enables accurate carrier phase recovery in the presence of carrier frequency offset for the first time.

The present disclosure includes a new laser linewidth-tolerant multi-stage feed-forward carrier phase recovery algorithm for arbitrary M-QAM modulation formats. As compared to the prior art, it is shown that the proposed new algorithm can significantly reduce the required computational efforts for high-order modulation formats. We also propose an edge detection frequency recovery method that essentially enables us to perform accurate carrier phase recovery even with carrier frequency offset.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of carrier phase error removal associated with an optical high-order communication signal, capable of achieving increased laser line-width tolerance, the method comprising:

estimating and removing a first phase angle associated with an information symbol using coarse phase recovery to provide a first coarse phase recovered signal, the information symbol being associated with a digital signal, the digital signal being an optical high-order communication signal;

estimating and removing a carrier frequency offset by using the estimated first phase angle to provide a carrier frequency offset removed signal, the carrier frequency offset being associated with a current information symbol;

removing carrier phase error associated with the carrier frequency offset; and estimating and removing a second phase angle associated with the optical high-order communication signal modulated with the current information symbol to provide a second refined phase recovered signal, the second phase angle being removed using the first coarse phase recovered signal and the carrier frequency offset removed signal by performing a maximum likelihood carrier phase estimation.

2. The method of claim 1, wherein estimating and removing the first phase angle comprises estimating the first phase angle using a decision-directed phase-locked loop.

3. The method of claim 1, wherein estimating and removing the first phase angle comprises estimating the first phase angle using a coarse blind phase search.

4. The method of claim 1, wherein estimating and removing the second phase angle comprises performing a maximum likelihood estimate based on the estimated first phase angle and the estimated carrier frequency offset.

5. The method of claim 1, wherein estimating and removing the second phase angle comprises performing a phase-constrained blind phase search.

6. The method of claim 1, further comprising estimating and removing a third phase angle associated with the information symbol, the third phase angle being based on the estimated second phase angle and the estimated carrier frequency offset.

7. The method of claim 6, wherein estimating and removing the third phase angle comprises performing a maximum likelihood estimate to generate a maximum likelihood estimator, the maximum likelihood estimator being used to adjust the estimated carrier frequency offset based on the estimated second phase angle.

8. An apparatus to perform carrier phase error removal associated with an optical high-order communication signal capable of achieving increased laser line-width tolerance, the apparatus comprising:

a processing device; and a receiver, the receiver receiving an information symbol, the information symbol being associated with a digital signal, the digital signal being the optical high-order communication signal, the receiver transmitting the information symbol to the processing device, the processing device estimating and removing a first phase angle associated with the information symbol using coarse phase recovery to provide a first coarse phase recovered signal, the processing device estimating and removing a carrier frequency offset using the estimated first phase angle to provide a carrier frequency offset removed signal, the carrier frequency offset removed signal being associated with the optical high-order communication signal modulated with a current information symbol, the processing device removing carrier phase error associated with the carrier frequency offset, the processing device estimating and removing a second phase angle associated with the optical high-order communication signal modulated with the current information symbol to provide a second refined phase recovered signal, the second phase angle being removed using the first coarse phase recovered signal and the carrier frequency offset removed signal by performing a maximum likelihood carrier phase estimation.

9. The apparatus of claim 8, wherein estimating and removing the first phase angle by the processing device comprises estimating the first phase angle using a decision-directed phase-locked loop.

10. The apparatus of claim 8, wherein estimating and removing the first phase angle by the processing device comprises estimating the first phase angle using a coarse blind phase search.

11. The apparatus of claim 8, wherein estimating and removing the second phase angle by the processing device comprises performing the maximum likelihood carrier phase estimation based on the estimated first phase angle and the estimated carrier frequency offset.

12. The apparatus of claim 8, wherein estimating and removing the second phase angle by the processing device comprises performing a phase-constrained blind-phase search.

13. The apparatus of claim 12, further comprising estimating and removing a third phase angle associated with the information symbol by the processing device, the third phase angle being based on the estimated second phase angle and the estimated carrier frequency offset.

14. The apparatus of claim 13, wherein estimating and removing the third phase angle by the processing device comprises performing a maximum likelihood estimate to generate a maximum likelihood estimator used to adjust the estimated carrier frequency offset based on the estimated second phase angle.

15. A non-transitory computer-readable storage medium storing instructions that, when executed by a processing device, cause the processing device to perform operations that perform carrier phase error removal associated with an optical high-order communication signal capable of achieving increased laser line-width tolerance, the operations comprising:
estimating and removing a first phase angle associated with an information symbol using coarse phase recovery to provide a first coarse phase recovered signal, the information signal being associated with a digital signal, the digital signal being an optical high-order communication signal;
estimating and removing a carrier frequency offset by using the estimated first phase angle to provide a carrier frequency offset removed signal, the carrier frequency offset being associated with the optical high-order communication signal modulated with a current information symbol;
removing carrier phase error associated with the carrier frequency offset; and
estimating and removing a second phase angle associated with the optical high-order communication signal modulated with the current information symbol to provide a second refined phase angle recovered signal, the second phase angle being removed using the first phase recovered signal and the estimated carrier frequency offset removed signal by performing a maximum likelihood carrier phase estimation.

16. The non-transitory computer-readable storage medium storing computer instructions of claim 15, wherein estimating and removing the first phase angle comprises estimating the first phase angle using a decision-directed phase-locked loop.

17. The non-transitory computer-readable storage medium storing computer instructions of claim 15, wherein estimating and removing the first phase angle comprises estimating the first phase angle using a coarse blind phase search.

18. The non-transitory computer-readable storage medium storing computer instructions of claim 15, wherein estimating and removing the second phase angle comprises performing a phase-constrained blind phase search.

19. The non-transitory computer-readable storage medium storing computer instructions of claim 15, wherein the operations further comprise estimating and removing a third phase angle associated with the information symbol by the processing device, the third phase angle being based on the estimated second phase angle and the estimated carrier frequency offset.

20. The non-transitory computer-readable storage medium storing computer instructions of claim 19, wherein estimating and removing the third phase angle comprises performing a maximum likelihood estimate to generate a maximum likelihood estimator used to adjust the estimated carrier frequency offset based on the estimated second phase angle.

* * * * *